Sept. 18, 1934.  A. L. WALLACE  1,974,383
HOSE COUPLING
Original Filed May 14, 1929
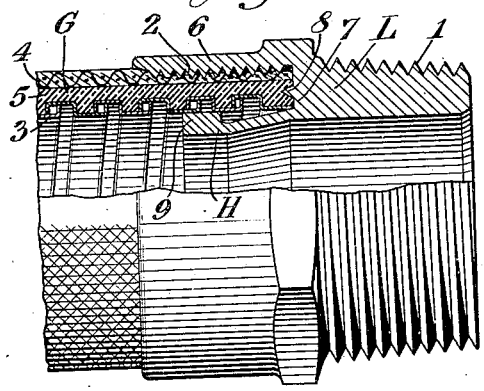
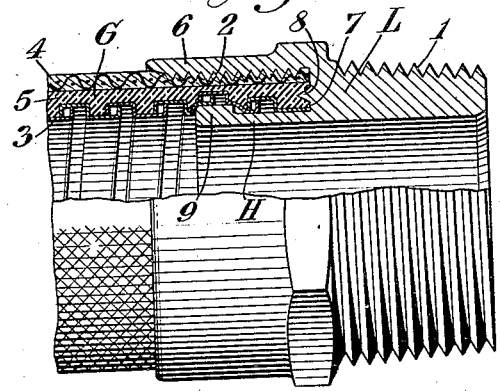
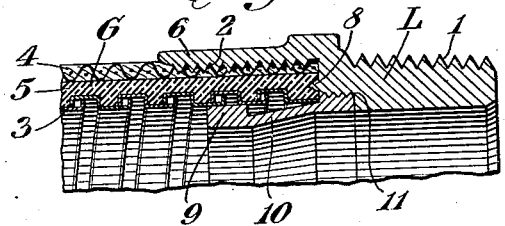
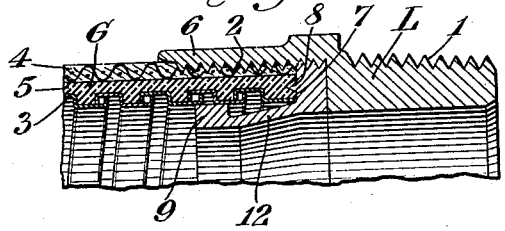
INVENTOR
Archibald L. Wallace
BY
ATTORNEY Patented Sept. 18, 1934

1,974,383

UNITED STATES PATENT OFFICE 1,974,383

HOSE COUPLING

Archibald L. Wallace, Brooklyn, N. Y., assignor to Metal Hose & Tubing Co., Inc., Brooklyn, N. Y., a corporation of New York Original application May 14, 1929, Serial No. 363,031. Divided and this application May 22, 1931, Serial No. 539,194

3 Claims. (Cl. 285—84)

This invention relates to a hose coupling of the character as shown and described in my pending application Serial No. 363,031, filed May 14th, 1929, which has matured into Patent No. 1,915,041 granted June 20, 1933, of which this is a divisional application, an object of the invention being to provide a coupling which is of small size and weight for a given size of hose, and which may be easily and securely attached to the hose by connection which is simple, durable and substantial and which is proof against leakage of gasoline.

A more detailed object of the present improvement is to provide a coupling which may be easily and cheaply manufactured and which may be quickly and cheaply attached into final sealing connection with the hose.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawing which is to be taken as a part of this specification, and in which I have shown merely a preferred form of embodiment of the invention:—

Fig. 1 is a side elevational view of a hose coupling having a section of hose connected therewith, a portion of the view being shown in longitudinal section to disclose the expansible part of the coupling as it appears just prior to being expanded.

Fig. 2 is a similar view illustrating the condition of the parts after the expansible part of the coupling has been expanded, and Figs. 3 and 4 are fragmentary detail views corresponding with the sectional portion of Fig. 1 but illustrating modified form of the expansible portion of the coupling.

Referring to the drawing for describing in detail the structures shown therein, and considering first the structure shown in Figs. 1 and 2, the reference character L indicates the body of the coupling. This is in the form of a hollow tubular shell externally threaded at its forward end as at 1 and internally threaded at its rear end as at 2, the former being to provide attachment to any foreign object, and the latter being to provide threaded engagement with the exterior annular surface of the hose which is indicated generally by the reference character G.

Interiorly of this body L there is provided an expansible tubular part H.

While this coupling may be attached to hose of different types and constructions it is particularly effective when used in connection with hose having a flexible metallic liner as 3, a coarse canvas cover as 4, and a rubber filler 5, such hose being commonly used for carrying gasoline and other hydro-carbon liquid fuel, and being known as "gasoline hose".

The threads 2 of the coupling are provided within a seat formed by a rearwardly extending apron-like portion as 6 of the body L. This seat is of an internal diameter, relative to the external diameter of the hose, such that movement of the hose into the seat by means of the threads 2, will cause the hose to be somewhat compressed in external diameter. The engagement of the threads 2 with the relatively soft surface of the canvas is sufficiently tight so that interrotation as between the coupling and hose during assembly will cause the hose to move relatively into the coupling and to at the same time squeeze and condense the rubber filler 5, and of course also the canvas 4. The hose may have a very tight fit against the threads 2, and yet be readily insertible into the seat because of the presence of said threads which operate somewhat automatically to draw the hose into the seat as a result of simple interrotation of the hose and coupling. Interrotation of the parts during assembly is rendered easy by reason of the fact that the canvas 4 presents only a soft and yielding engagement with the threads during this operation, so that a thread-way is easily formed in the canvas by the threads 2 as the hose progresses into the seat. The yielding of the rubber filler 5 also assists in enabling easy assembly by interrotation of the parts.

The liner 3, being of relatively stiff metal will maintain its diameter unchanged during movement of the hose into the coupling seat.

As the hose is screwed into the seat the inner end edge surface of the hose is brought into tight engagement against the rearwardly facing annular end wall 7 of the seat. This wall is preferably provided with an annular rearwardly facing V-shaped rib 8 so positioned that it will become forcefully embedded within the rubber filler 5 of the hose when the hose is threaded home against the wall.

The expansible tubular part H is formed integrally with the body L and extends rearwardly from the wall 7 so that it projects into the interior of the hose as the hose is screwed inwardly along the threads 2 and against the wall 7. It is normally tapered to a reduced diameter rearwardly away from the wall 7, and at its smaller or rear end it is formed with a radially projecting bead or head as 9 thereon, said head being normally of an exterior diameter sufficiently small so that the hose may readily pass over it when entering the seat of the body.

The expansible tubular part H stands within the apron 6, and hence opposed to that portion of the hose which is within the apron, the head 9 being thus in position to directly engage the inner surface of the liner 3 of the hose when the expansible part is expanded.

It is particularly noted that the head 9 of the part H is spaced a considerable distance rearwardly of the wall 7.

After a piece of hose has been screwed into the seat of the coupling and against the wall 7 to the position as indicated in Fig. 1 a suitable expanding tool of any appropriate type, not illustrated, is introduced into the coupling and into the part H and is thereupon operated to expand said part H from the position Fig. 1 to the position illustrated in Fig. 2, it being of course understood that the part H is of suitable material such as soft brass, to enable it to be thus expanded and to enable it to remain in its expanded position as in Fig. 2 after withdrawal of the tool.

By inspection of Fig. 2 it will be seen that the extension of the part H has caused the enlarged head 9 of said part to press against and to expand the adjacent portion of the metallic liner 3 of the hose so that the portion of the rubber filler 5 immediately overlying said head 9 has become materially compressed, and so that the adjacent portion of the canvas cover 4, in engagement with the threads 2 of the apron, has been correspondingly forced into tighter and more secure engagement with said threads 2.

It is particularly noted that this compression of the rubber and canvas has also caused considerable portions of the rubber to be squeezed forwardly and forcefully crowded against the wall 7. The rubber has been condensed between the head 9 and the wall 7 and about the V-shaped rib 3 as a relatively hardened and strengthened annular head between said wall 7 and the head 9, and the canvas 4 surrounding and forming a part of this head has thereby been forced into a more intimate and tighter engagement with the threads 2 than before.

An exceedingly tight joint between the hose and the coupling is thus provided which is readily capable of preventing leakage of liquid such as gasoline or the like. The connection is also of great mechanical strength due to the intimate and forceful engagement of the canvas with the threads 2 and to the presence of the annular head produced upon the hose interengaging behind the head 9 of the coupling part H. The interlocking engagement of the head 9 within the annular depression which is formed by itself within the metallic liner 3 of the hose greatly increases the mechanical strength of the bond, and at the same time provides for a good and efficient electrical connection between the coupling and the hose for taking care of static discharges.

In extreme instances the hose, if desired, may have its end portion dipped into liquid shellac or other suitable cementitious material just prior to insertion of the hose within the coupling. This material will seal any possible crevices and is particularly serviceable in guarding the rubber against attack from the gasoline.

In the modification Fig. 3 the structure is the same as above described in all respects except that the expansible part here illustrated, and designated by the reference character 10, is formed separately from the body L and is attached to the body by suitable means such as by being threaded into the body as indicated at 11. The threaded connection 11 may preferably be of a firm and tight character so that once the part 10 is assembled with the main body of the coupling it will thereafter always remain attached.

The modification Fig. 4 suggests that if desired the separately formed expansible part, here indicated by the reference character 12, may be shaped to include the wall or shoulder 7 and the V-shaped rib 8, also that it may in this event be threaded into the body of the coupling by means of the threads 2, thereby avoiding necessity for the formation of separate threads as 11 in Fig. 3.

The tubular part H—10—12 has an external diameter at its juncture with the wall 7 such as to snugly receive and fit into the end of the metallic liner 3 of the hose thereby supporting the end portion of said liner against collapse at all times.

It will be understood that in all instances the radial head or bead 9 is a continuous annular part, and that the seat or depression which it forms, and into which it engages in the interior of the liner 3, when it is expanded, is also continuous and annular. This, taken together with the firm connection of the tubular part with the main body of the coupling provides great strength and positiveness of connection between the hose and the coupling.

As many changes could be made in this construction without departing from the scope of the invention as defined in the following claims, it is intended that all matter contained in the above description, or shown in the accompanying drawing, shall be interpreted as illustrative only and not in a limiting sense.

Having thus described my invention, what I claim as new and desire to secure by Letters Patent is:—

1. A hose coupling comprising a body having a seat therein adapted to receive the end portion of a piece of hose extending thereinto, and a separately formed single-piece tubular member having one portion of its length disposed to stand within the portion of the hose within the seat and having the remainder of its length disposed to project out of the end of the hose and being threaded to engage co-operative threads of the body whereby the tubular member is held connected with the body, the portion of the tubular member which is disposed to stand within the hose being of a deformable character adapting it to be expanded into gripping engagement with the inner surface of the hose, but the portion of said tubular member which is threaded being of an indeformable character so as to preserve the threads thereof against change incident to the operation of expanding the first portion.

2. A hose coupling comprising a body having a seat therein adapted to receive the end portion of a piece of hose extending thereinto and having an annular shoulder therein constituting the inner end of said seat adapted to be engaged by the inner end edge surface of the hose to limit longitudinal inward movement of the hose, the body being formed also with a second seat continuing inwardly from the inner annular edge of said shoulder and being threaded and having a second shoulder at its inner end, and a separately formed single-piece tubular member having its inner end portion extending into said second seat and provided with threads engaging the threads of said second seat to hold it in position, said tubular member outwardly of its threaded inner end portion being adapted to extend into the portion of the hose within the first seat and being of a deformable character adapting it to be expanded into gripping engagement with the inner surface of the hose, and the portion of the tubular member which is threaded being of relatively greater diameter than the adjacent outer portion of said tubular member and thereby providing a shoulder upon said tubular member, said shoulder being disposed as a radially inward continuation of the first mentioned shoulder of the body in the same plane therewith and co-operative therewith in opposing longitudinal inward movement of the hose into the first seat, the threaded joint between the body and the tubular member thereby standing in a position so that the end edge surface of a piece of hose positioned in the coupling will abut both the first shoulder of the body and the shoulder of the tubular member and thus bridge and seal said threaded joint.

3. A hose coupling comprising a body having a threaded seat therein adapted to receive the end portion of a piece of hose threaded thereinto and having an annular shoulder therein constituting the inner end of said seat, and a separately formed single-piece tubular member having one portion of its length disposed to stand within the portion of the hose within the seat, and having the remainder of its length disposed to project out of the end of the hose, the portion which is disposed to stand within the hose being of a deformable character adapting it to be expanded into gripping engagement with the inner surface of the hose, the portion which projects out of the end of the hose being of relatively greater diameter than the adjacent portion which is adapted to stand within the hose, said projecting portion being formed with threads on its outer annular surface having co-operative thread engagement with the threads of said seat to thereby hold the tubular member connected with the body in position engaging against the end shoulder of said seat, the relatively greater diameter of the projecting portion providing a shoulder upon the tubular member adapted to be engaged by the inner end edge surface of the hose to limit movement of the hose into said seat and said projecting portion of the tubular member being of an indeformable character so as to preserve the threads thereof against change incident to the operation of expanding the deformable portion of said tubular member.

ARCHIBALD L. WALLACE.